United States Patent
Alasry et al.

(10) Patent No.: US 10,850,741 B2
(45) Date of Patent: Dec. 1, 2020

(54) SYSTEMS AND METHODS FOR AUTOMATED VEHICLE DRIVING THAT MIMIC SAFE DRIVER BEHAVIORS

(71) Applicants: Denso International America, Inc., Southfield, MI (US); DENSO CORPORATION, Kariya (JP)

(72) Inventors: Bilal Alasry, Dearborn, MI (US); Doua Vang, Waterford, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 104 days.

(21) Appl. No.: 15/709,583

(22) Filed: Sep. 20, 2017

(65) Prior Publication Data

US 2019/0084578 A1 Mar. 21, 2019

(51) Int. Cl.
*B60W 50/00* (2006.01)
*B60W 10/184* (2012.01)
(Continued)

(52) U.S. Cl.
CPC ........ *B60W 50/0098* (2013.01); *B60W 10/04* (2013.01); *B60W 10/184* (2013.01); *B60W 10/20* (2013.01); *B60W 30/18163* (2013.01); *B60W 50/08* (2013.01); *B60W 2050/002* (2013.01); *B60W 2050/0014* (2013.01);
(Continued)

(58) Field of Classification Search
CPC .. B60W 50/0098; B60W 10/04; B60W 50/08; B60W 30/18163; B60W 10/20; B60W 10/184; B60W 2420/54; B60W 2420/52; B60W 2540/30; B60W 2540/20; B60W 2550/10; B60W 2050/002; B60W 2050/0014; B60W 2540/12; B60W 2540/18; B60W 2550/22; B60W 2420/42; B60W 2555/60; B60W 2554/00; B60W 40/09; B60W 2556/45; B60W 2050/146; B60W 2530/14; B60W 2050/0089; B60W 2050/0088; B60W 2556/00;
(Continued)

(56) References Cited

U.S. PATENT DOCUMENTS 8,634,980 B1   1/2014   Urmson et al.
8,965,621 B1   2/2015   Urmson et al.
(Continued)

*Primary Examiner* — Kimberly S Berona
*Assistant Examiner* — Michael V Kerrigan
(74) *Attorney, Agent, or Firm* — Harness, Dickey & Pierce, P.L.C.

(57) ABSTRACT

A system includes a pattern recognizing module that identifies a pattern based on at least one of: (i) a movement of a driver of a vehicle, (ii) an object in front of the vehicle, (iii) a status of the vehicle, and (iv) an action of the vehicle. The pattern corresponds to a pattern response. A safety module compares the pattern response to a safe maneuver database. The pattern response is classified as safe in response to the pattern response matching at least one safe pattern response of the safe maneuver database. A pattern integration module integrates the pattern and the pattern response into a pattern database in response to the pattern response matching the at least one safe pattern response of the safe maneuver database. A vehicle control module performs the pattern response in response to the pattern recognizing module identifying the pattern.

20 Claims, 5 Drawing Sheets

(51) Int. Cl.
*B60W 10/20* (2006.01)
*B60W 30/18* (2012.01)
*B60W 50/08* (2020.01)
*B60W 10/04* (2006.01)

(52) U.S. Cl.
CPC ..... *B60W 2420/42* (2013.01); *B60W 2420/52* (2013.01); *B60W 2420/54* (2013.01); *B60W 2540/12* (2013.01); *B60W 2540/18* (2013.01); *B60W 2540/20* (2013.01); *B60W 2540/30* (2013.01); *B60W 2554/00* (2020.02); *B60W 2555/60* (2020.02)

(58) Field of Classification Search
CPC ..... B60W 2540/225; B60W 2540/223; B60W 60/0015
See application file for complete search history.

(56) References Cited

U.S. PATENT DOCUMENTS

| | | | |
|---|---|---|---|
| 9,171,217 B2 * | 10/2015 | Pawlicki | B60W 30/18 |
| 9,454,150 B2 | 9/2016 | Uehara | |
| 2002/0128751 A1 * | 9/2002 | Engstrom | G05B 13/027 701/1 |
| 2016/0046298 A1 | 2/2016 | DeRuyck et al. | |
| 2018/0284774 A1 * | 10/2018 | Kawamoto | B60W 50/10 |

\* cited by examiner

SYSTEMS AND METHODS FOR AUTOMATED VEHICLE DRIVING THAT MIMIC SAFE DRIVER BEHAVIORS

FIELD

The present disclosure relates to automated driving systems of a vehicle, and more particularly to systems and methods for automated driving that mimic safe driver behaviors by recognizing and implementing driver behavior patterns.

BACKGROUND

Automated drive vehicles may have a set of rules in order to effectively and safely navigate roadways. Some control systems of automated drive vehicles may include rules that meet the goal of effectively and safely navigating the roadways but may make an occupant of the vehicle uncomfortable. For example, changing lanes at high rates of speed or too quickly could make the occupant uncomfortable.

To make the occupant more comfortable, additional measures may be taken to improve a communication channel between the occupant of the vehicle and the decision making module of the automated drive vehicle. Further, adapting driving characteristics of a driver of the vehicle may also increase the comfort of the occupant and/or the driver.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a pattern recognizing module that identifies a pattern based on at least one of: (i) a movement of a driver of a vehicle, (ii) an object in front of the vehicle, (iii) a status of the vehicle, and (iv) an action of the vehicle. The pattern corresponds to a pattern response. A safety module compares the pattern response to a safe maneuver database. The pattern response is classified as safe in response to the pattern response matching at least one safe pattern response of the safe maneuver database. A pattern integration module integrates the pattern and the pattern response into a pattern database in response to the pattern response matching the at least one safe pattern response of the safe maneuver database. A vehicle control module performs the pattern response in response to the pattern recognizing module identifying the pattern.

A method includes identifying a pattern based on at least one of: (i) a movement of a driver of a vehicle, (ii) an object in front of the vehicle, (iii) a status of the vehicle, and (iv) an action of the vehicle. The pattern corresponds to a pattern response. The method also includes comparing the pattern response to a safe maneuver database. The pattern response is classified as safe in response to the pattern response matching at least one safe pattern response of the safe maneuver database. The method further includes integrating the pattern and the pattern response into a pattern database in response to the pattern response matching the at least one safe pattern response of the safe maneuver database. The method includes performing the pattern response in response to identifying the pattern.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

To develop driver trust of the automated drive vehicle and to increase comfort and/or safety, the systems and methods of the present disclosure identify patterns that occur immediately before an action of the vehicle, also known as a pattern response. Based on physical driver cues, environmental cues regarding objects near the vehicle, and signals occurring within the vehicle, a learning module can recognize and pair patterns and pattern responses. For example, the learning module may recognize that the driver of the vehicle always changes lanes when the distance between the vehicle and an object in front of a vehicle is less than 5 feet. Additionally, the learning module may recognize that the driver also checks a blind spot immediately before changing lanes and may apply the brakes of the vehicle.

After a predetermined period or after a threshold number of times of the learning module observing the same pattern with the same pattern response, the learning module may integrate the pattern and the pattern response into a database. From then on, when the vehicle is operating in an autonomous mode, a vehicle control module can access the database and, in response to recognizing one, all, or a subset of the patterns occurring prior to the pattern response, the vehicle control module may perform the pattern response. For transparency, the vehicle may display the pattern response on a display module of a center stack of the vehicle, so the driver is made aware of the decision of the vehicle control module to perform the pattern response.

Figure 1:
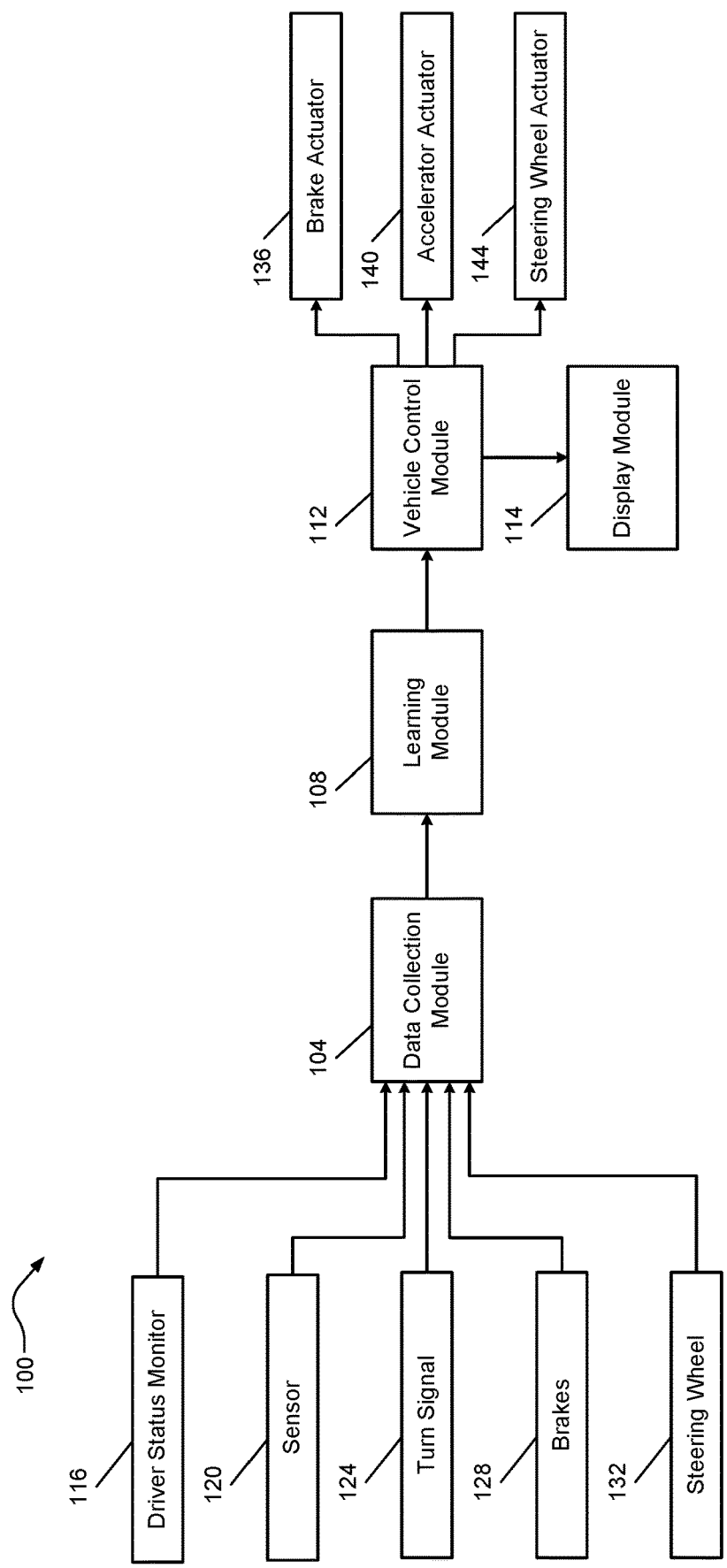
FIG. 1 is a functional block diagram of a safe driver behavior system integrated with a vehicle.

Referring to FIG. 1, a functional block diagram of a safe driver behavior system 100 integrated with a vehicle is shown. The safe driver behavior system 100 includes a data collection module 104, a learning module 108, a vehicle control module 112, and a display module 114. The data collection module 104 receives signals from a driver status monitor (DSM) 116, a sensor 120, a turn signal 124, brakes 128, and a steering wheel 132. The data collection module 104 is configured to monitor behaviors of a driver of the vehicle. For example, the data collection module 104 receives data from the DSM 116 regarding movement of the driver's eyes, head, neck, and arms. The data collection module 104 can collect information via the DSM 116 indicating that the driver is physically checking a blind spot of the vehicle, checking rear view mirrors of the vehicle, and/or rotating their head and eyes periodically.

The data collection module 104 also receives data from the sensor 120. The sensor 120 may be a radar system, a sonar system, a LIDAR system, a camera, and/or another environmental sensor for detecting information about and/or objects in the surrounding environment of the vehicle. While one sensor 120 is illustrated, multiple sensors positioned around the vehicle can be used. The multiple sensors, for example, could include combinations of sensors, such as multiple cameras, radar sensors, sonar sensors, LIDAR sensors, etc. The sensor 120 is configured to collect data to identify objects in front of the vehicle. The sensor 120 may also collect data to identify objects to the side of or to the rear of the vehicle. The sensor 120 may be able to collect data to identify when the vehicle changes lanes as well as when the distance between vehicles and objects (for example, other vehicles) increases or decreases. Further, the sensor 120 may determine when the relative speed of the vehicle with respect to the object changes. That is, the sensor 120 can collect data to identify when the vehicle is travelling at a higher speed than an object travelling in the same lane.

The data collection module 104 may particularly collect data to identify patterns when the vehicle changes lanes or where the distance between the vehicle and objects changes based on information from the sensor 120. The data collection module 104 may, for example, monitor patterns such as when the driver: (i) maintains an increased distance between the vehicle and objects in front of the vehicle, (ii) maintains the vehicle outside of a blind spot of other objects, (iii) moves the vehicle towards the edge of a lane upon passing a tractor trailer or when an object in an adjacent lane encroaches on the lane of the vehicle, (iv) moves out of the right-most lane when approaching an entry and/or exit ramps on a freeway, and/or (v) changes lanes with a low rate of speed. The data collection module 104 may monitor any patterns specific to the driver. Even when the data collection module 104 monitors a pattern and a pattern response that does not affect the safety of the driver or the vehicle, the safe driver behavior system 100 may choose to perform the pattern response in response to the pattern to further mimic the driver's driving characteristics.

The turn signal 124 may be a right turn signal and/or a left turn signal. The data collection module 104 may monitor the driver's use of the turn signal to glean the driver's intent to switch lanes based on current conditions. For example, if the sensor 120 determines that the distance between the vehicle and the object has significantly decreased (for example, the vehicle is within 5 feet of the object), the driver may actuate the turn signal 124, indicating the driver intends to switch lanes. While the automated drive system may include a lane change when the vehicle is within a certain range of objects or other vehicles, the driver may want to change lanes before the automated drive system would require a lane change. Therefore, the safe driver behavior system 100 may identify a pattern where the driver of the vehicle prefers to change lanes at a larger distance than is required and at a slower speed. The safe driver behavior system 100 can integrate and mimic this behavior in the vehicle control module 112.

The data collection module 104 also receives a signal from the brakes 128 of the vehicle. In this way, the data collection module 104 can monitor when the driver applies the brakes 128 and when the driver taps the brakes 128, potentially indicating to an object that the object is too close (for example, tailgating). In this instance, the safe driver behavior system 100 may mimic tapping the brakes 128 when an object is within a certain distance of the rear of the vehicle.

The data collection module 104 also receives a signal from the steering wheel 132. The data collection module 104 may monitor when the driver alters a direction of the vehicle and also monitor other signals when the driver alters the direction of the vehicle. For example, based on information received from the data collection module 104, the learning module 108 may idenitfy when the vehicle is close to an object (for example, 5 feet), the driver may apply the brakes 128 and the steering wheel 132 may change directions, indicating that the driver prefers to slow down and/or change lanes when the vehicle is within a certain distance of the object. The data collection module 104 may also receive signals from a horn, an accelerator pedal, etc., for the learning module 108 to identify, for example, when the driver honks the horn and when the driver accelerates.

While the safe driver behavior system 100 may already accomplish the end result of some of the identified patterns, the safe driver behavior system 100 may opt to adjust how those end results are accomplished. For example, the safe driver behavior system 100 may perform the identified patterns to mimic the driver's driving characteristics to reach the end result instead of a previously programmed method of operation. As long as the identified patterns do not negatively affect the safety of the driver or vehicle, the safe driver behavior system 100 may opt to mimic the driver's patterns. In this way, the safe driver behavior system 100 accomplishes the end result using the identified pattern as a driver of the vehicle would, encouraging the driver to trust the autonomous vehicle.

The data collection module 104 may monitor all aspects of the vehicle for the learning module 108 to identify patterns of behavior of the driver. For example, based on information from the data collection module 104, the learning module 108 may determine that when an object is less than 10 feet in front of the vehicle and the driver checks the left blind spot, the driver engages the left turn signal and changes lanes. Recognizing the pattern of events when the driver changes lanes allows the safe driver behavior system 100 to include the pattern in the system control to mimic the driver's behavior.

The data collection module 104 of the safe driver behavior system 100 sends information to the learning module 108 to identify patterns that are classified into two main categories: actions that occur during a vehicle maneuver and actions that occur upon interaction with an object. Therefore, the data collection module 104 monitors driver behaviors when the above actions occur. Examples of actions that occur during a vehicle maneuver include vehicle lane changes, vehicle turns, etc. Examples of actions that occur upon interaction with an object include objects passing or merging near the vehicle, checking blind spots, etc.

The data collection module 104 monitors driver behavior for a predetermined period, for example, at least three months. Alternatively, the data collection module 104 may monitor each behavior until the pattern and pattern response have been performed a threshold number of times. The pattern recognizing module 212 identifies patterns and pattern responses while the pattern database 224 stores the patterns and the pattern responses. The pattern database 224 is further configured to store any recognized pattern with the corresponding pattern response along with a frequency value indicating the number of times the pattern and pattern response have occurred. Once the data collection module 104 has collected an acceptable amount of data regarding the driver behaviors, the learning module 108 can determine whether the identified pattern increases safety, decreases safety, or whether safety remains unaffected. Then, the pattern may be classified as safe, unsafe, or unaffected. The safe driver behavior system 100 may include the safe and unaffected patterns in a pattern database 224 (shown in FIG. 2) that the vehicle control module 112 accesses to determine which pattern response to perform in response to a known pattern. As discussed above, the unaffected patterns may be included so that the safe driver behavior system 100 further mimics driver behavior.

For example, as mentioned previously, the safe driver behavior system 100 may include the safe and unaffected patterns in the pattern database 224 for the vehicle control module 112 to access when the vehicle is in an autonomous mode. That is, the data collection module 104 may monitor driver behavior while the driver is operating the vehicle or during a training mode. The vehicle control module 112 may access those patterns collected during the training mode after the driver has set the vehicle into the autonomous mode. In this way, the vehicle may mimic driver behaviors while operating in the autonomous mode.

Once the pattern is integrated into the pattern database 224, the vehicle control module 112 performs the pattern response in response to an occurrence of the pattern. That is, when the learning module 108 identifies the pattern included in the pattern database 224, the vehicle control module 112 performs the pattern response. The pattern response may include actuating a brake actuator 136, actuating an accelerator actuator 140, or actuating a steering wheel actuator 144. For example, if the pattern involves identifying when the vehicle is too close to an object, the pattern response may be actuating the brake actuators 136 to slow the vehicle speed. Alternatively, the pattern response may be actuating the steering wheel actuator 144 to alter a trajectory of the vehicle, for example into an adjacent lane. In some implementations, when the learning module 108 identifies that the driver behavior is to change lanes (due to an object in front of the vehicle in the same lane) and an object is in the vehicle's blind spot of the lane the vehicle is going to merge into, the vehicle control module 112 can include a pattern response that actuates the accelerator actuator 140 to safely change lanes.

Once the vehicle control module 112 determines the pattern response of the vehicle, the display module 114 displays the pattern response to the driver through the display module 114. The display module 114 may display the pattern response in a graphic format, such as through a graphical user interface (GUI). In some implementations, the safe driver behavior system 100 may include an audio indication that the vehicle control module 112 is performing the pattern response.

Figure 2:
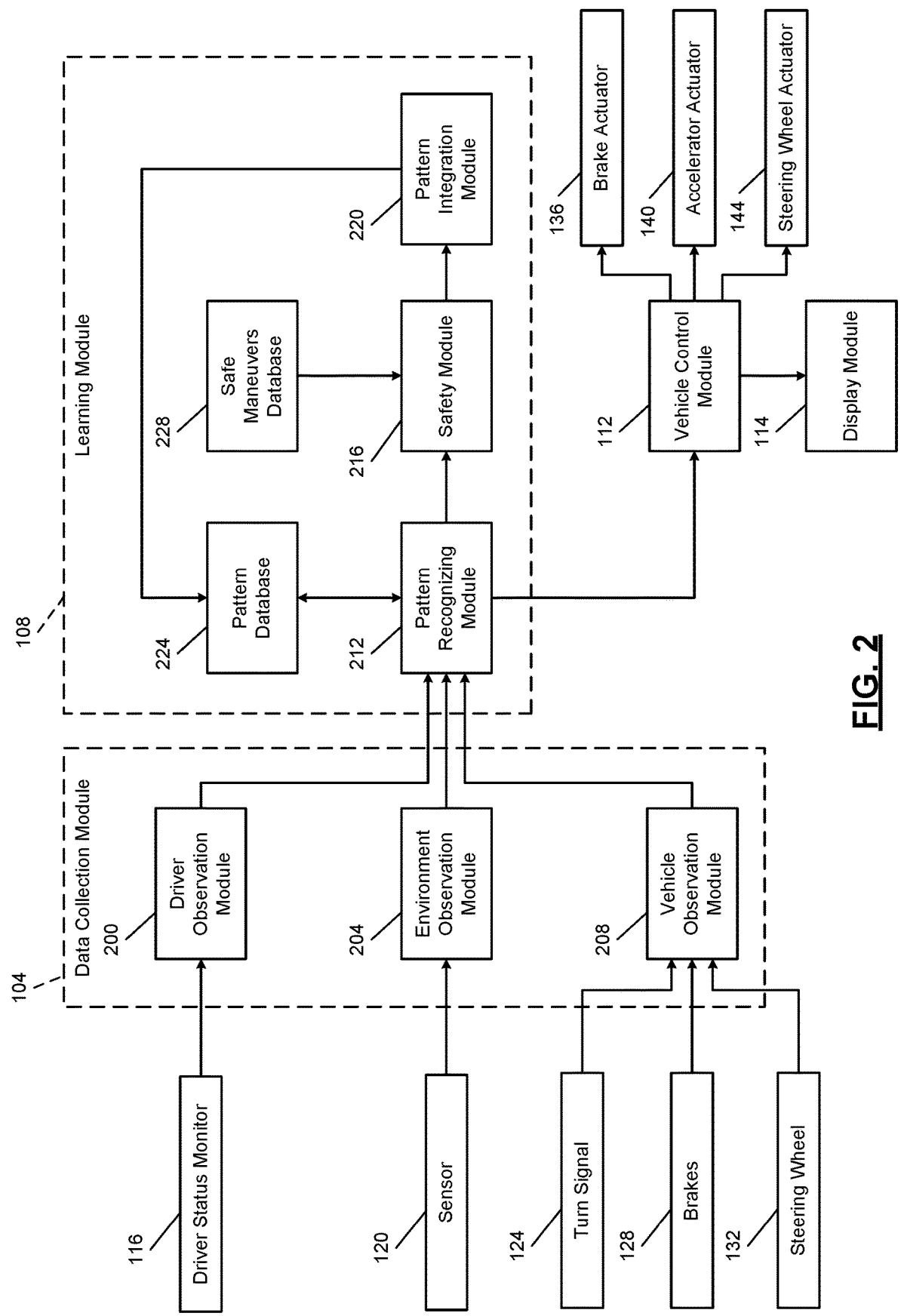
FIG. 2 is a functional block diagram of an implementation of the safe driver behavior system.

In FIG. 2, a functional block diagram of an implementation of the safe driver behavior system 100 is shown. The data collection module 104 includes a driver observation module 200, an environment observation module 204, and a vehicle observation module 208. Each module within the data collection module 104 is configured to receive and collect information regarding areas throughout the vehicle. The information collected from each module of the data collection module 104 can be used together to identify patterns.

The driver observation module 200 receives data from the DSM 116. The driver observation module 200 receives information regarding the movements and positioning of the driver's eyes, head, neck, and arms.

The environment observation module 204 receives information from the sensor 120. The environment observation module 204 receives information regarding objects in the road in front of the vehicle, such as other vehicles, from the sensor 120. As mentioned previously, the sensor 120 is configured to identify objects in front of the vehicle, to the side of the vehicle, and/or to the rear of the vehicle. The vehicle observation module 208 receives information from the turn signal 124, the brakes 128, and the steering wheel 132. The vehicle observation module 208 determines the status of the vehicle, meaning whether the vehicle is braking, accelerating, or attempting to change lanes. The vehicle observation module 208 may also receive information regarding vehicle speed. Further, the vehicle observation module 208 can determine the position of the vehicle, for example, based on signals received from a global positioning system (GPS). Moreover, the vehicle observation module 208 may determine an action of the vehicle, such as whether the vehicle is changing lanes based on a signal from the steering wheel 132. The action of the vehicle may be determined to be the pattern response.

The learning module 108 includes a pattern recognizing module 212, a safety module 216, and a pattern integration module 220. The pattern recognizing module 212 receives pattern information from the driver observation module 200, the environment observation module 204, and the vehicle observation module 208. The pattern recognizing module 212 identifies patterns of driver behavior based on information collected from the driver, the vehicle positioning, and the vehicle status. That is, the pattern recognizing module 212 receives information from the driver observation module 200, the environment observation module 204, and the vehicle observation module 208 to determine if a pattern and a pattern response are established. The pattern recognizing module 212 may access the pattern database 224 to determine if the pattern matches a pattern already integrated in the vehicle control module 112. That is, once a pattern and pattern response are established, the vehicle control module 112 performs the pattern response once the pattern recognizing module 212 recognizes the previously stored pattern. In some implementations, in order for the pattern to be stored in the pattern database 224, the pattern and the pattern response must be recognized and performed a threshold number of times. Alternatively, patterns and pattern responses may be collected for a predetermined period.

The pattern response is a predetermined response that is recognized as being performed by the driver in response to the pattern. For example, the pattern may be the driver checking a blind spot before performing the response of changing lanes. The pattern recognizing module 212 may receive information from the driver observation module 200 indicating that the driver is checking the blind spot, information from the environment observation module 204 indicating that an object is 5 feet from the vehicle, and information from the vehicle observation module 208 indicating that the driver is braking. The pattern recognizing module 212 may recognize that, in previous similar situations, the driver directed the vehicle into an adjacent lane, as determined by the steering wheel 132 signal received through the vehicle observation module 208. Therefore, the events identified by the pattern recognizing module 212 establish a pattern (checking blind spot, identifying object and object distance, braking) with a pattern response (changing lanes). For example, the pattern recognizing module 212 determines that when the driver checks a blind spot and the distance between the vehicle and an object is small, for example, 5 feet, the driver will respond by switching lanes.

Once the pattern and the pattern response are established, both are stored in the pattern database 224.

Once the pattern is recognized, the safety module 216 determines whether the pattern response increases safety, decreases safety, or does not affect safety. The safety module 216 references a safe maneuvers database 228 to compare the pattern response to known safe maneuvers.

Alternatively, the vehicle may include an onboard method of classifying the pattern response. For example, the safety module 216 may determine a pattern response is safe in response to the pattern meeting various metrics. That is, the safety module 216 may determine a pattern response is safe when a distance between the vehicle and an object is increased, when vehicle speed during vehicle maneuvers is reduced, etc.

The pattern integration module 220 receives the patterns and pattern responses that the safety module 216 identifies as safe. The pattern integration module 220 can reference the pattern database 224 to determine whether the vehicle control module 112 already adheres to the recognized safe pattern response by determining whether the recognized safe pattern response is identified as executable. The pattern database 224 may include patterns that have already been incorporated to the safe driver behavior system 100 for control to follow, along with pattern responses for each pattern. Additionally, the pattern integration module 220 integrates the pattern and the pattern response into the pattern database 224. Further, once the pattern and the pattern response have been identified and performed the predetermined number of times and once the safety module 216 classifies the pattern and pattern response as safe, the pattern database 224 identifies the pattern and the pattern response as executable. That is, the pattern database 224 stores all recognized patterns and pattern responses once identified and performed as well as identified as safe. The pattern database 224 monitors the number of occurrences of the pattern and the corresponding pattern response. Once the pattern and pattern response have occurred the predetermined number of times (i.e., the pattern integration module 220 integrates the pattern and pattern response into the pattern database 224 and a count of occurrences exceeds the predetermined number of times), the pattern and pattern response are marked as executable in the pattern database 224.

In some implementations, the vehicle control module 112 can access the pattern database 224 directly to execute the pattern response in response to recognizing the pattern. As shown in FIG. 2, the vehicle control module 112 receives information from the pattern recognizing module 212. When the pattern recognizing module 212 recognizes a pattern that is stored in the pattern database 224 along with the pattern response to the pattern and is marked as executable, the vehicle control module 112 performs the pattern response. This is because the pattern database 224 marks recognized patterns along with the pattern response as executable once the recognized pattern and pattern response have been performed a threshold number of times.

The vehicle control module 112 receives a signal from the pattern recognizing module 212 indicating the recognized pattern and the pattern response to be performed. That is, the pattern recognizing module 212 recognizes a safe pattern that is marked as executable and instructs the vehicle control module 112 to perform the pattern response. As discussed above, the vehicle control module 112 may actuate the brake actuator 136, the accelerator actuator 140, and/or the steering wheel actuator 144. The display module 114 can display to the driver the pattern response the vehicle control module 112 is performing.

Figure 3:
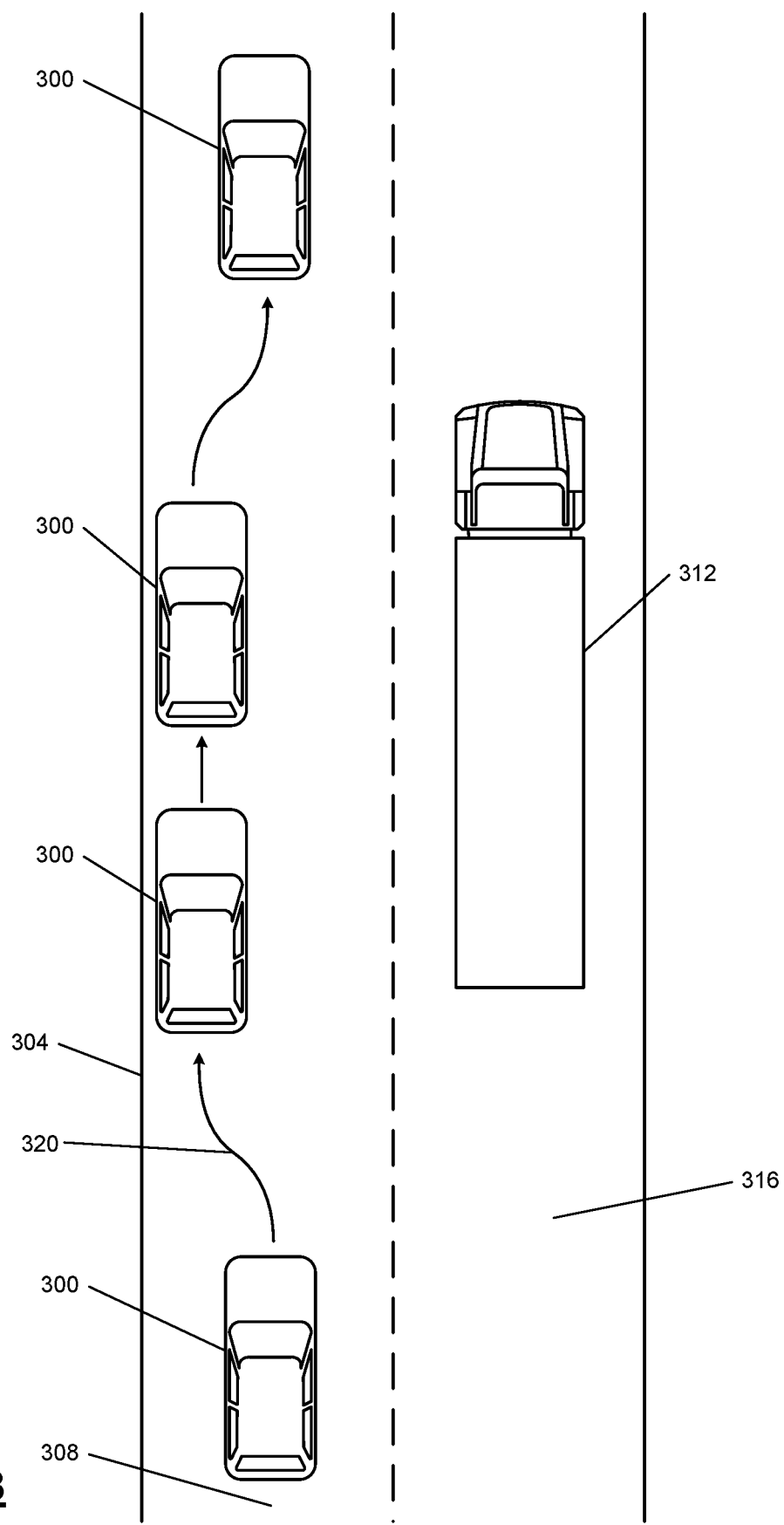
FIG. 3 is a traffic scenario with a vehicle using the safe driver behavior system.

In FIG. 3, an example traffic scenario with a vehicle 300 using the safe driver behavior system 100 of the present disclosure is shown. In the example, the vehicle 300 moves toward an outermost portion 304 of a lane 308 in response to the vehicle 300 passing a semi-truck 312 in an adjacent lane 316. As the vehicle 300 approaches the semi-truck 312, the vehicle control module 112 changes a trajectory 320 to the outermost portion 304 of the lane 308. In some implementations, the display module 114 may display a graphic similar to that shown in FIG. 3 to represent to the driver the pattern response the vehicle control module 112 is performing.

Figure 4:
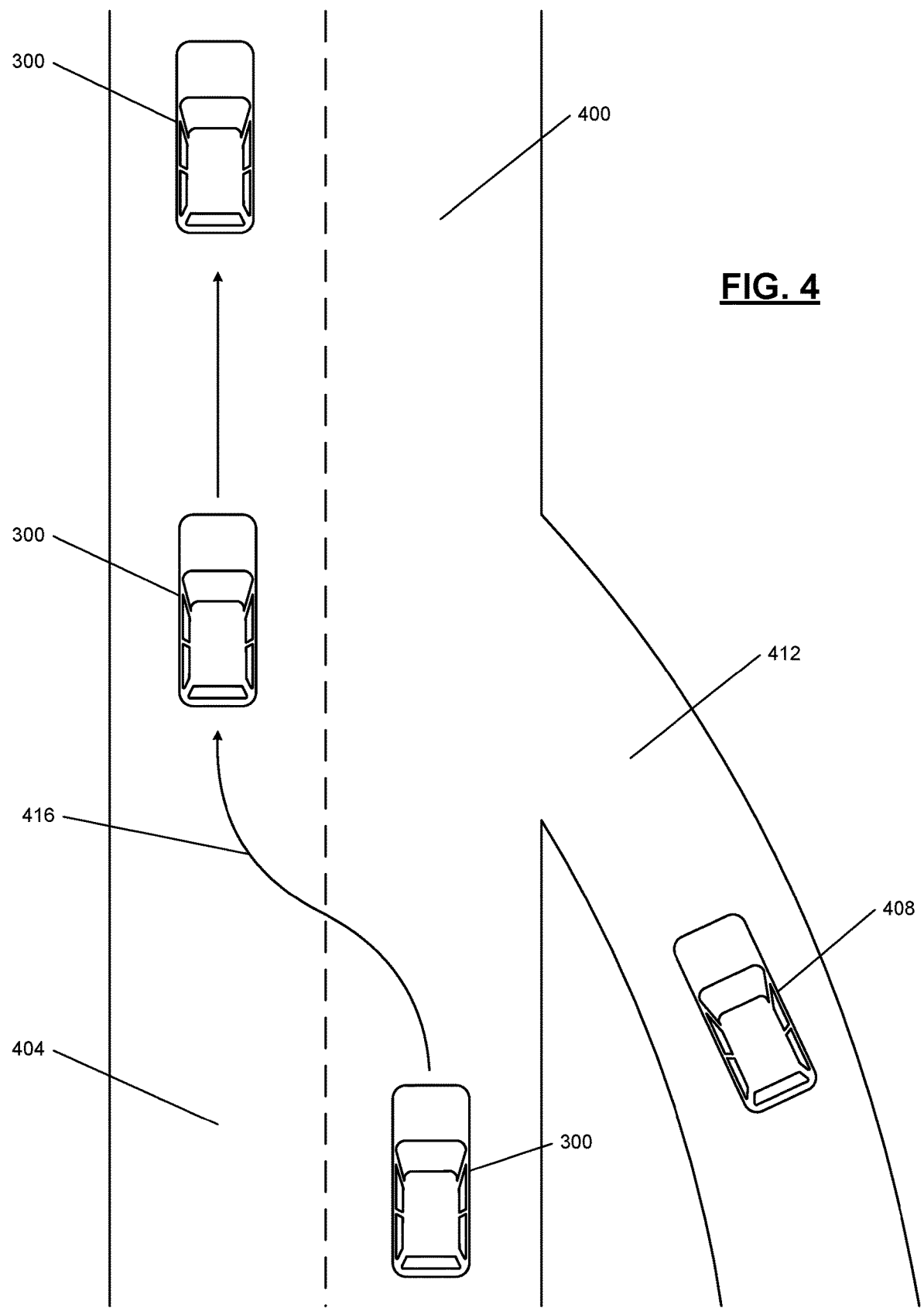
FIG. 4 is another traffic scenario with a vehicle using the safe driver behavior system.

In FIG. 4, another traffic scenario with the vehicle 300 using the safe driver behavior system 100 is shown. The vehicle 300 moves from a current lane 400 to an adjacent lane 404 in response to detecting an object 408 travelling along a freeway entry ramp 412. The vehicle control module 112 changes a trajectory 416 of the vehicle 300, moving the vehicle 300 from the current lane 400 to the adjacent lane 404. Similar to FIG. 3, FIG. 4 is another example of a graphic the display module 114 may display to the driver of the vehicle 300, indicating to the driver the pattern response the vehicle control module 112 is performing.

Figure 5:
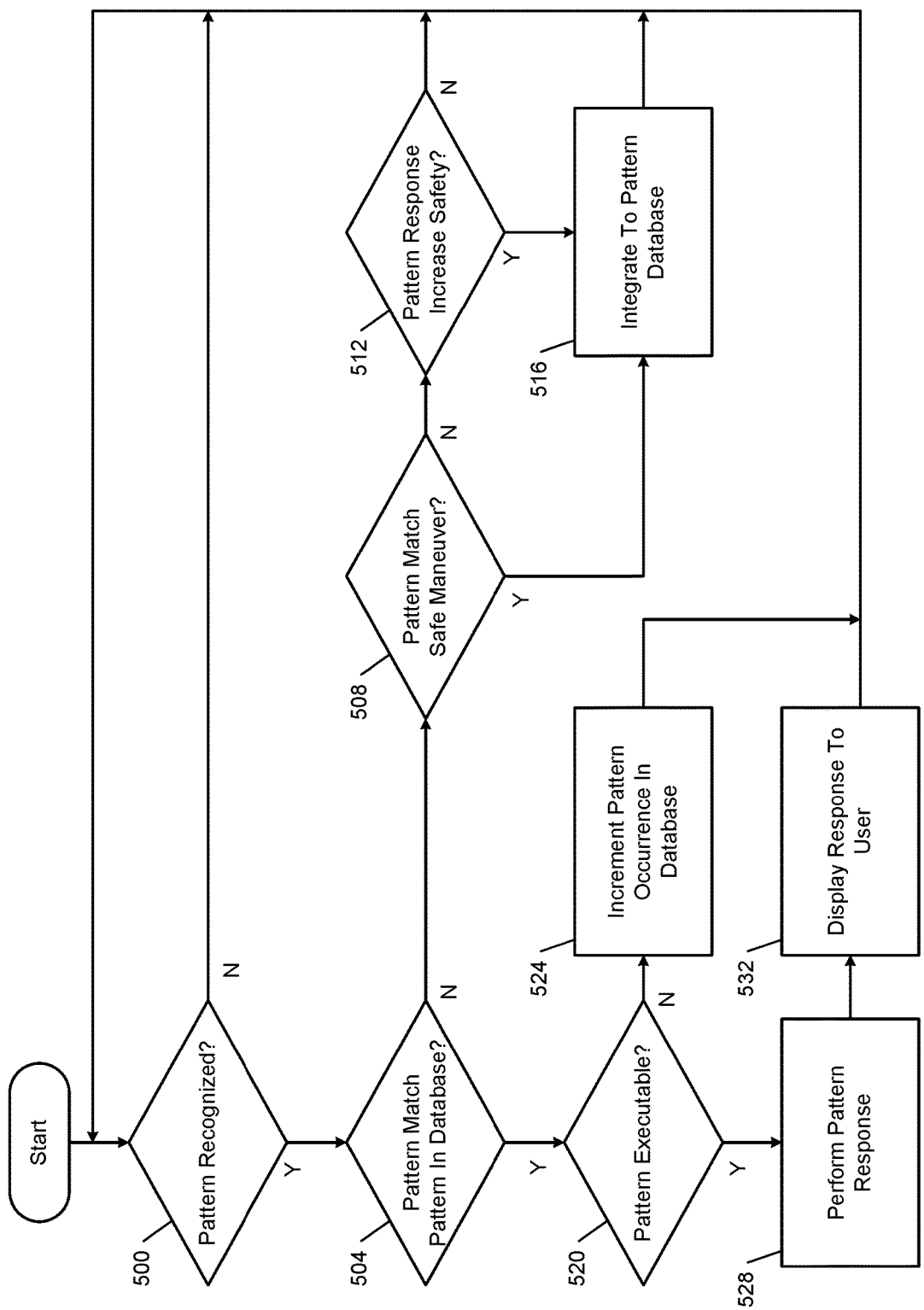
FIG. 5 is a flow diagram of an implementation of the safe driver behavior system.

In FIG. 5, a flow diagram of an implementation of the safe driver behavior system 100 is shown. Control begins at 500, where the pattern recognizing module 212 determines whether information from the driver observation module 200, the environment observation module 204, and the vehicle observation module 208 establishes a pattern or matches a recognized pattern. If 500 is false, control waits until a driver behavior establishes a pattern.

Once 500 is true, control continues to 504 where the pattern recognizing module 212 determines whether the recognized pattern matches a pattern in the pattern database 224. If the recognized pattern does not match a pattern in the pattern database 224, control continues to 508. At 508, the safety module 216 determines whether the pattern matches a safe maneuver stored in the safe maneuvers database 228. If 508 is false, control continues to 512 to determine if the pattern response increases the safety of operating the vehicle. That is, since the recognized pattern is not stored in the pattern database 224, control is determining whether the pattern and the pattern response should be stored in the pattern database 224. Therefore, if the safety module 216 determines at 512 that the pattern response of the recognized pattern increases safety, control continues to 516 where the pattern integration module 220 integrates the recognized pattern and the pattern response into the pattern database 224.

As mentioned previously, as long as the identified patterns do not negatively affect the safety of the driver or vehicle, the safe driver behavior system 100 may opt to mimic the driver's patterns. Therefore, at 512, control may determine whether the pattern response decreases safety. In this way, the pattern integration module 220 will integrate the recognized pattern and the pattern response as long as the recognized pattern and the pattern response do not decrease safety.

Once integrated into the pattern database 224 at 516, control returns to the beginning at 500. The next time the integrated pattern occurs, the pattern will match the pattern in the pattern database 224 at 504.

Returning to 508, if the recognized pattern matches a safe maneuver in the safe maneuver database 228, control continues to 516 to integrate the recognized pattern and the pattern response into the pattern database 224.

Returning to 504, if the recognized pattern matches a pattern in the pattern database 224, control continues to 520. At 520, control determines if the recognized pattern is marked as executable in the pattern database 224. If the recognized pattern is not marked as executable in the pattern database 224, control continues to 524. At 524 the pattern occurrence is incremented and stored in the pattern database 524. That is, the pattern database 224 maintains a count of occurrences of each recognized pattern. Once the recognized pattern has been performed the predetermined number of times, the pattern integration module 220 marks the pattern as executable in the pattern database 224. Once marked as executable, the vehicle control module 112 may perform the pattern response in response to recognizing the pattern when the vehicle is in autonomous mode. Once the pattern occurrence is incremented at 524, control returns to the beginning at 500.

If the recognized pattern is marked as executable at 520, control continues to 528. At 528, the vehicle control module 112 performs the pattern response marked as executable in the pattern database 224. For example, when information from the driver observation module 200, the environment observation module 204, and the vehicle observation module 208 indicate a changing lane pattern, the pattern response is to change lanes. While the vehicle control module 112 performs the pattern response autonomously, control continues to 532 where the display module 114 displays the autonomously performed pattern response to the driver of the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   at least one processor and
   a non-transitory memory coupled to the at least one processor,
   wherein the non-transitory memory stores:
      a safe maneuver database,
      a pattern database, and
      instructions that, when executed by the at least one processor, cause the at least one processor to:
   identify a pattern and a pattern response based on at least one of: (i) a movement of a driver of a vehicle, (ii) an object in front of the vehicle, (iii) a status of the vehicle, and (iv) an action of the vehicle, wherein the pattern response occurs in response to the pattern;
   compare the pattern response to the safe maneuver database, wherein the pattern response is classified as safe in response to the pattern response matching at least one safe pattern response of the safe maneuver database;
   integrate the pattern and the pattern response into the pattern database in response to the pattern response matching the at least one safe pattern response of the safe maneuver database; and
   in response to recognizing a first pattern:
      identify a first set of pattern responses stored in the pattern database, wherein the first set of pattern responses can safely be performed in response to recognizing the first pattern;
      compare each response of the first set of pattern responses to a previously programmed response;
      perform a first pattern response from the first set of pattern responses when a first safety score of the first pattern response is equal to or greater than a preset safety score of the previously programmed response; and
      perform the previously programmed response when the preset safety score of the previously programmed response is greater than the first safety score of the first pattern response.

2. The system of claim 1 wherein the instructions further cause the at least one processor to:
   recognize a behavior of the driver of the vehicle;
      monitor the movement of the driver of the vehicle;
      identify the object in front of the vehicle; and
      determine at least one of (i) the status of the vehicle and (ii) the action of the vehicle.

3. The system of claim 2 wherein the instructions further cause the at least one processor to:
   identify the pattern and the pattern response based on the behavior of the driver of the vehicle, and
   integrate the pattern and the pattern response into the pattern database after receiving a predetermined amount of data recognizing the behavior of the driver of the vehicle.

4. The system of claim 2 wherein the instructions further cause the at least one processor to identify the pattern after receiving data recognizing the behavior of the driver of the vehicle for a predetermined period.

5. The system of claim 2 wherein the instructions further cause the at least one processor to monitor the movement of the driver of the vehicle by imaging at least one of: (i) an eye of the driver, (ii) a head of the driver, (iii) a neck of the driver, and (iv) an arm of the driver.

6. The system of claim 2 wherein data is received from at least one of (i) a radar sensor, (ii) a sonar sensor, (iii) a LIDAR sensor, and (iv) a camera.

7. The system of claim 2 wherein the instructions further cause the at least one processor to identify a lane marking of a road in front of the vehicle.

8. The system of claim 2 wherein the instructions further cause the at least one processor to determine an actuation of at least one of (i) a right turn signal, (ii) a left turn signal, (iii) a brake of the vehicle, and (iv) a steering wheel of the vehicle.

9. The system of claim 1 wherein the safe maneuver database includes a plurality of predetermined safe pattern responses that the vehicle can perform.

10. The system of claim 1 wherein the first pattern response of is at least one of (i) changing a lane of the vehicle, (ii) changing a position of the vehicle in a current lane of the vehicle, (iii) actuating a brake of the vehicle, and (iv) actuating an accelerator of the vehicle.

11. A method comprising:
identifying a pattern and a pattern response based on at least one of: (i) a movement of a driver of a vehicle, (ii) an object in front of the vehicle, (iii) a status of the vehicle, and (iv) an action of the vehicle, wherein the pattern response occurs in response to the pattern;
comparing the pattern response to a safe maneuver database, wherein the pattern response is classified as safe in response to the pattern response matching at least one safe pattern response of the safe maneuver database;
integrating the pattern and the pattern response into a pattern database in response to the pattern response matching the at least one safe pattern response of the safe maneuver database; and
in response to recognizing a first pattern:
identifying a first set of pattern responses stored in the pattern database, wherein the first set of pattern responses can safely be performed in response to recognizing the first pattern;
comparing each response of the first set of pattern responses to a previously programmed response;
performing a first pattern response from the first set of pattern responses when a first safety score of the first pattern response is equal to or greater than a preset safety score of the previously programmed response; and
performing the previously programmed response when the preset safety score of the previously programmed response is greater than the first safety score of the first pattern response.

12. The method of claim 11 further comprising:
recognizing a behavior of the driver of the vehicle;
monitoring the movement of the driver of the vehicle;
identifying the object in front of the vehicle; and
determining at least one of (i) the status of the vehicle and (ii) the action of the vehicle.

13. The method of claim 12 further comprising:
identifying the pattern and the pattern response based on the behavior of the driver of the vehicle; and
integrating the pattern and the pattern response into the pattern database after receiving a predetermined amount of data recognizing the behavior of the driver of the vehicle.

14. The method of claim 12 further comprising:
identifying the pattern after receiving data recognizing the behavior of the driver of the vehicle for a predetermined period.

15. The method of claim 12 further comprising monitoring the movement of the driver of the vehicle by imaging at least one of: (i) an eye of the driver, (ii) a head of the driver, (iii) a neck of the driver, and (iv) an arm of the driver.

16. The method of claim 12 wherein data is received from at least one of (i) a radar sensor, (ii) a sonar sensor, (iii) a LIDAR sensor, and (iv) a camera.

17. The method of claim 12 further comprising identifying a lane marking of a road in front of the vehicle.

18. The method of claim 12 further comprising determining an actuation of at least one of (i) a right turn signal, (ii) a left turn signal, (iii) a brake of the vehicle, and (iv) a steering wheel of the vehicle.

19. The method of claim 11 wherein the safe maneuver database includes a plurality of predetermined safe pattern responses that the vehicle can perform.

20. The method of claim 11 wherein the first pattern response is at least one of (i) changing a lane of the vehicle, (ii) changing a position of the vehicle in a current lane of the vehicle, (iii) actuating a brake of the vehicle, and (iv) actuating an accelerator of the vehicle.

* * * * *

UNITED STATES PATENT AND TRADEMARK OFFICE
CERTIFICATE OF CORRECTION

PATENT NO. : 10,850,741 B2  
APPLICATION NO. : 15/709583  
DATED : December 1, 2020  
INVENTOR(S) : Bilal Alasry et al.

Page 1 of 1

It is certified that error appears in the above-identified patent and that said Letters Patent is hereby corrected as shown below:

In the Claims

Column 11, Line 57: In Claim 1, after "processor", insert --,--

Column 12, Line 33: In Claim 2, after "vehicle", insert --,--

Column 12, Line 67: In Claim 10, after "response", delete "of"

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*